United States Patent Office 2,758,823
Patented Aug. 14, 1956

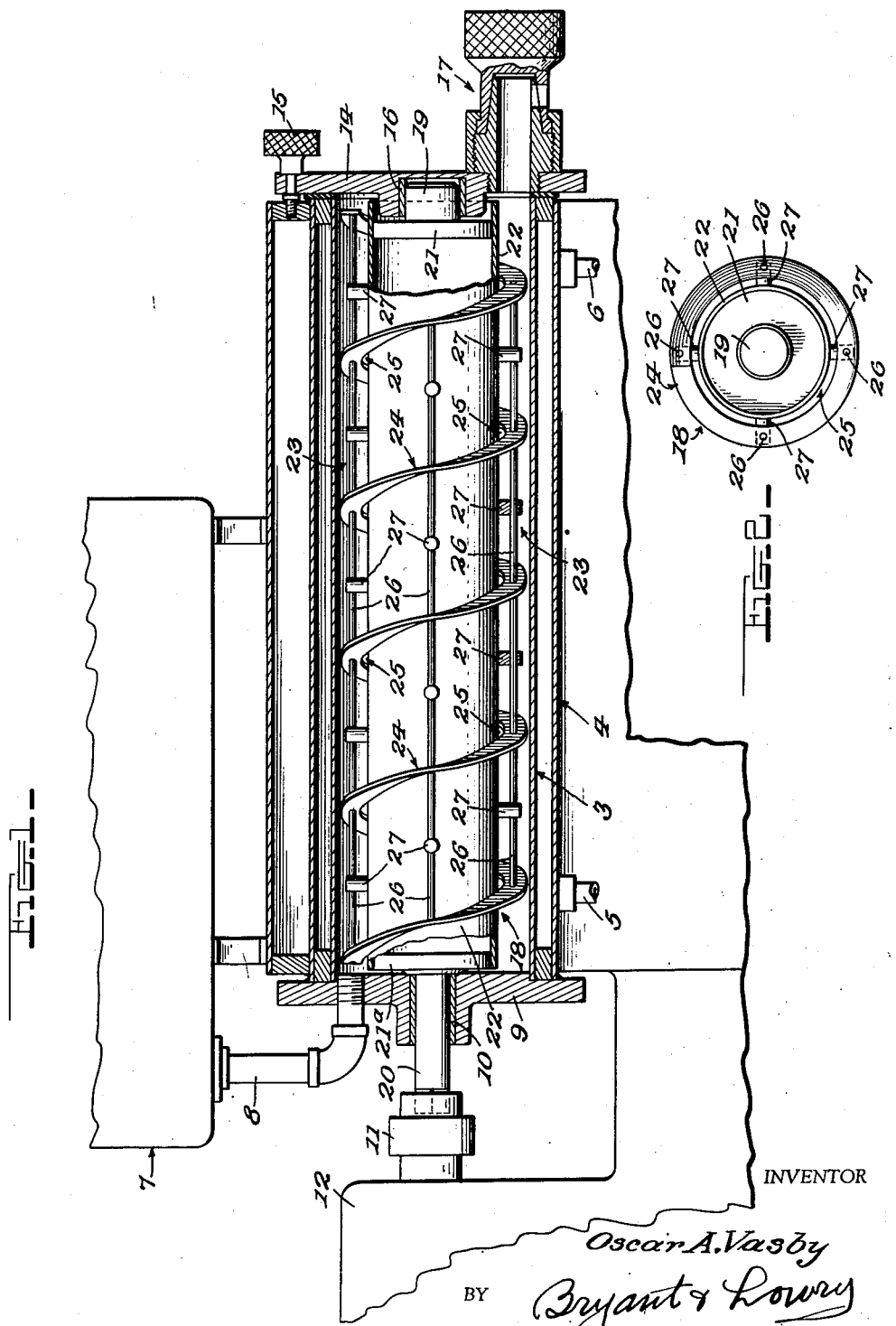

2,758,823

ICE CREAM FREEZER AND DISPENSER

Oscar A. Vasby, Fort Atkinson, Wis.

Application August 23, 1954, Serial No. 451,461

3 Claims. (Cl. 259—9)

This invention relates to a commercial type machine for freezing and dispensing ice cream, frozen custard and the like. Such machines commonly comprise a fixed cylinder surrounded by refrigerating means, an inlet for the mix into one end of said cylinder, a valved outlet at the other end of said cylinder through which the frozen product is extruded, and a driven mixing and extruding auger within and coaxial with said cylinder.

The present invention provides a new and improved mixing and extruding dasher which takes the place of the conventional auger and provides for more efficient operation of the machine.

One object of the invention is to provide a dasher which will fill a large portion of the volume of the cylinder and leave only a relatively small space between dasher and cylinder wall. The mix thus passes through the cylinder in the form of a relatively thin sleeve surrounding the dasher and contacting with the cylinder wall to insure quick and efficient freezing.

The dasher has a central cylinder surrounded by a helical auger blade but said cylinder is of a diameter much greater than that of the usual central shaft of the conventional auger. Therefore, the auger blade is much narrower radially than the conventional auger blade, with less liability of the frozen mix accumulating on the blade and interfering with proper operation thereof.

In the conventional auger, the greatest accumulation occurs at the juncture of the auger blade with the central shaft. The present invention, however, is designed to provide an improved construction in which the entire auger blade is spaced radially from the central cylinder to allow some of the frozen product to continuously work backward through the space between cylinder and auger blade, thus preventing it from freezing to the dasher.

A further object of the invention is to provide a freezing device with a relatively large amount of freezing area while at the same time achieving a reduction of the amount of product in the refrigerating cylinder at any one time. This is an important practical advantage in machines of this type, since during slow periods in sales the product remains in the cylinder for some time, and is subjected to repeated beating and churning, which tends to break down the product into a more liquid form. The present invention in reducing the amount of product in the refrigerating cylinder at any given time assures that only a small portion of product is subjected to this repeated beating, while the increased area of the refrigerating surface assures that the product freezes faster, and the machine will not fall behind during rush periods.

A further object of the invention is to provide novel means for mounting the auger blade on the central cylinder, in spaced relation with the latter.

A still further object of the invention is to provide the auger-blade-mounting means in such form as to provide effective beating means for the mix as it is being frozen.

Yet another object of the invention is to provide an extremely simple dasher construction which may be inexpensively manufactured, will give trouble-free service and may be cleaned with ease.

With the above and other objects in view that will become apparent as the nature of the invention is better understood, the same consists in the novel form, combination and arrangement of parts hereinafter more fully described, shown in the accompanying drawing, and particularly claimed.

In the accompanying drawing:

Fig. 1 is a longitudinal sectional view, partly in elevation, showing a freezing machine improved in accordance with the present invention; and Fig. 2 is a front end elevation of the dasher.

In the drawing above briefly described, the cylinder in which the product is to be frozen, is shown at 3, said cylinder having a refrigerant jacket 4 provided as usual with an inlet 6 and outlet 5 for the refrigerant. Above the cylinder and jacket is a tank 7 for the mixture to be frozen, said tank being connected by a duct 8 with the rear end wall 9 of the cylinder 3. This end wall has a central bearing 10 aligned with a drive coupling 11 on a driving head 12. The front end wall 14 of the cylinder 3 is detachably secured by screws, one of which is shown at 15, and said front end wall has a central bearing 16. This end wall also carries an outlet valve 17 for the frozen product. All of the elements 3 to 17, inclusive, are conventional.

Centrally within the cylinder 3 is the improved dasher 18. The front end of this dasher has a bearing stub 19 in the bearing 16, and the rear end of said dasher has a stub shaft 20 which extends through the bearing 10 and has removable engagement with the drive coupling 11. The bearing stub 19 and stub shaft 20 may be integral with two disks 21 and 21ª respectively, which disks are secured in and close the ends of the central cylinder 22 of the dasher 18.

The diameter of the cylinder 22 is much greater than that of the usual central shaft of the conventional auger heretofore commonly employed and it therefore fills a large portion of the volume of the cylinder 3. Consequently, the mix being frozen must pass in the form of a relatively thin sleeve through the space 23 between the fixed cylinder 3 and the cylinder 22 of the dasher 18, thereby insuring quick freezing.

An auger blade 24 surrounds the cylinder 22 and is radially spaced in its entirety from said cylinder 22. Due to the relatively large diameter of this cylinder, the auger blade 24 is much narrower radially than the usual auger blade on a central shaft and therefore there is less liability of the frozen product accumulating on said blade and causing trouble. Moreover, some of the product continuously works rearwardly through the space 25 between the auger blade 24 and the central cylinder 22 during auger operation. Thus, no freezing of the product to the dasher will here occur, whereas heretofore a trouble zone, in this regard, has existed at the juncture of the conventional auger blade with its shaft.

The various turns of the auger blade 24 are mounted on longitudinal rods 26 which are circumferentially spaced about the cylinder 22, and these rods are mounted on short posts 27. The posts 27 are welded or otherwise secured to the dasher cylinder 22 between the various turns of the auger blade 24. The rods 26 are similarly secured to the auger blade 24. Thus, the auger blade is effectively mounted in spaced relation with the cylinder 22. Moreover, the rods 26 and posts 27 constitute effective beaters for the mix as it is being frozen and thus insure the desirable incorporation of some air into the product.

Due to the novel construction of the dasher it is feasible to employ it within a freezing cylinder of much greater diameter than the conventional cylinder, to give greater production per unit of time, but it is to be understood that a larger cylinder would require a proportionately larger dasher, as the outer edge of the auger blade 24 should always be in extremely close relation with the freezing cylinder.

As the dasher is a single unit, it may be easily removed for cleaning and re-inserted with equal ease.

From the above detailed description of the invention, it is belivered that the construction, use, and operation thereof will at once be apparent, and while there is herein shown and described the preferred embodiment of the invention, it is nevertheless to be understood that minor changes may be made therein without departing from the spirit and scope of the invention as claimed.

I claim:

1. A dasher for an ice cream or similar freezer comprising a central longitudinal cylinder having bearing-engaging means, and a radially narrow auger blade surrounding and rotatable with said central cylinder, said cylinder being of much greater diameter than the shaft of a conventional freezer auger, said auger blade having an inner edge spaced outwardly from said central cylinder, longitudinal rods circumferentially spaced about said central cylinder and secured to the convolution of said auger blade, and radial posts to which said rods are secured, said posts being secured to said central cylinder between the auger convolutions.

2. A dasher for an ice cream or similar freezer comprising a central longitudinal cylinder having bearing-engaging means, and an auger blade surrounding said central cylinder, said auger blade having an inner edge spaced outwardly from said central cylinder, longitudinal rods circumferentially spaced about said central cylinder and secured to the convolutions of said auger blade, and radial posts to which said rods are secured, said posts being secured to said central cylinder between the auger convolutions.

3. In an ice cream or similar freezer having a hollow freezing cylinder closed at its ends, said freezing cylinder having an inlet at one end and an outlet at its other end; a rotary dasher extending longitudinally within and coaxial with said cylinder, said dasher including a central longitudinal hollow cylinder sufficiently filling said freezing cylinder as to insure passage of only a thin sleeve-like mass of mix between said central cylinder and said freezing cylinder, and a ribbon-like auger blade surrounding and rotatable with said central cylinder, said auger blade having its inner edge spaced outwardly from said central cylinder to allow some of the product being frozen to continuously work back through the space between said auger blade and said central cylinder, said auger blade being maintained in its spaced relation to said central cylinder by means of a plurality of longitudinal rods extending through the convolutions of the blade, and the said rods being supported intermediate said convolutions by posts projecting radially from the cylindrical wall of said central cylinder and secured thereto.

References Cited in the file of this patent

UNITED STATES PATENTS

| | | |
|---|---|---|
| 488,995 | Frick | Jan. 3, 1893 |
| 998,335 | Fox | July 18, 1911 |
| 1,763,121 | Bailey | June 10, 1930 |
| 2,023,607 | Miller | Dec. 10, 1935 |
| 2,506,101 | Oltz | May 2, 1950 |
| 2,554,769 | Arnold | May 29, 1951 |